G. H. RATLEDGE, Sr.
ADJUSTABLE TRESTLE.
APPLICATION FILED JULY 27, 1909.

957,094.

Patented May 3, 1910.

Witnesses
William C. Linton
Wm. L. Werth

Inventor
George H. Ratledge Sr.
By Victor J. Evans
Attorney

UNITED STATES PATENT OFFICE.

GEORGE H. RATLEDGE, SR., OF COLORADO SPRINGS, COLORADO.

ADJUSTABLE TRESTLE.

957,094.  Specification of Letters Patent.  Patented May 3, 1910.

Application filed July 27, 1909. Serial No. 509,827.

*To all whom it may concern:*

Be it known that I, GEORGE H. RATLEDGE, Sr., a citizen of the United States, residing at Colorado Springs, in the county of El Paso and State of Colorado, have invented new and useful Improvements in Adjustable Trestles, of which the following is a specification.

This invention relates to adjustable trestles primarily intended for use by mechanics, and the object of the invention is to provide a device of this character which may be easily and quickly arranged to any desired height or which may be lowered when desired.

With the above, and other objects in view, which will appear as the description progresses, the invention resides in the novel construction and combination of parts hereinafter fully described and claimed.

In the accompanying drawings there has been illustrated a simple and preferred embodiment of the device, and in which:—

Figure 1:
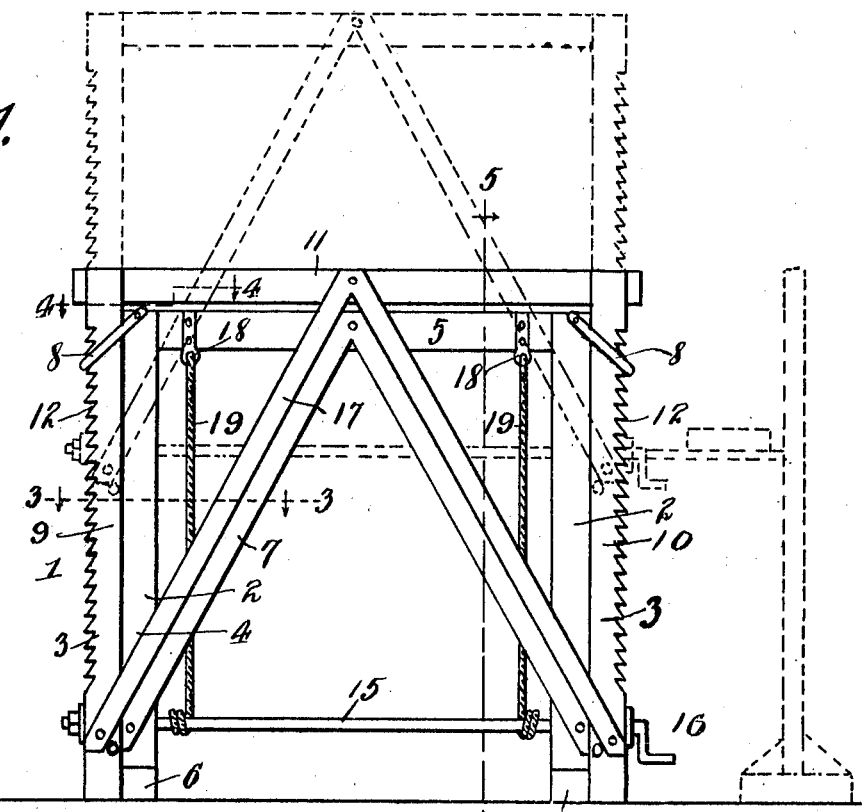
Figure 2:
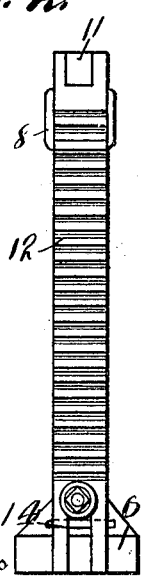
Figure 3:
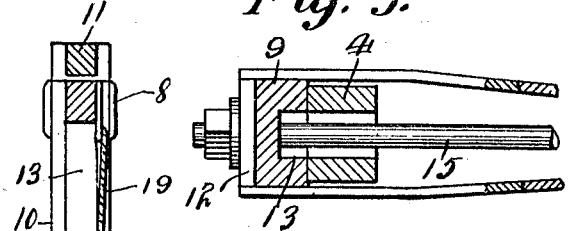
Figure 4:
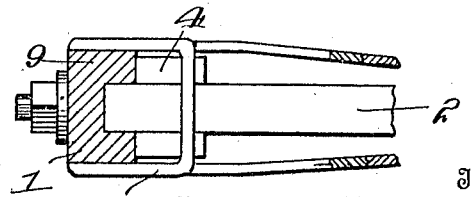

Figure 1 is a front elevation of a trestle constructed in accordance with my invention. Fig. 2 is an end elevation of the same. Fig. 3 is a sectional view upon the line 3—3 Fig. 1. Fig. 4 is a sectional view upon the line 4—4 Fig. 1. Fig. 5 is a vertical sectional view upon the line 5—5 Fig. 1.

In the accompanying drawing the numeral 1 designates the improved adjustable trestle. The trestle 1 comprises essentially an inner and an outer frame, designated respectively by the numerals 2 and 3. The frame 2 is the stationary element of the device and comprises a pair of vertical standards 4 connected by a horizontal beam 5.

By reference to Fig. 5 of the drawings, it will be noted that the standards 4, upon each of the sides of the frame 2 are constructed of a pair of members suitably spaced apart and connected at their top portion through the medium of a horizontal member 5 and at their bottom portions through the medium of suitable feet 6 arranged transversely of the said members. The side standards 4 are each provided with suitable substantially V-shaped brace members 7 connecting the top horizontal member 5, and whereby a strong and rigid frame is provided. The horizontal member 5 of the frame 2 is adapted to extend a suitable distance beyond the ends of the standards 4, for a purpose hereinafter to be set forth, and the frame 2 is provided at its top and adjacent its ends with suitable transversely arranged recesses which are adapted for the reception of bales 8, the purpose of which will be hereinafter fully described.

The outer frame 3 comprises a pair of vertical standards 9 and 10 which are connected at their upper edges through the medium of a longitudinal connecting bar or beam 11. The standards 9 have their outer faces provided for a suitable distance with a plurality of spaced teeth 12 while their inner faces are provided with vertically extending grooves 13, and the said grooves 13 are adapted for the reception of the extending portions of the horizontal member 5 of the frame 2, while the teeth 12 are adapted to be engaged by the bales 8 also carried by the frame 2. The lower extremities of the standards 9 are each bifurcated as at 14 and these bifurcations are adapted to provide a reception for the longitudinally extending hollow bar 15 which has its ends provided with suitable washers or offsets whereby the said bar 15 is effectively retained upon the outer faces of the standards 9. It is to be understood that the hollow bar 15 projects between the spaced standards 4 of the frame 2, and the bar 15 preferably comprises a hollow cross-sectionally circular member for the reception of a handle 16.

The standards 9 and 10 are provided with substantially V-shaped brace members 17, of a similar construction to the brace members 7, heretofore described in connection with the frame 2, and the said brace member 17 securely connects the top longitudinal bar 11 with the said standards 9 and 10.

The longitudinal member 5 of the frame 2 is provided with a pair of depending eye members 18, and these members are adapted for the reception of a suitable cable 19 which has its end wound around the rod or shaft 15, as clearly shown in Fig. 1 of the drawings.

In operating the device, it is merely necessary to revolve the handle 16, so as to rotate the bar or shaft 15, thus coiling the cables 19 around the said bar, and as the ends of the rod or shaft 15 contact the horizontal wall provided by the bifurcations 14, the outer frame 3 will be caused to ride upwardly upon the inner frame 2, as illustrated by the dotted lines in Fig. 1. It will be noted that the bales 8 will automatically engage with the teeth 12 of the standards 9 when the frame 1 is elevated and thus effectively retain the said frame in its raised position. When it is desired to lower the frame 3 upon the frame 2, it is merely necessary to disengage the bales 8 from the teeth 12 when the frame 3, owing to its weight will descend to its initial position upon the frame 2.

From the above description taken in connection with the accompanying drawings, the advantages of construction and method of operation will be apparent to those skilled in the art to which the device appertains, and it will be noted that both the longitudinal connecting members 11 and 5 may be employed as a support for the boards or timbers affording a scaffold and that, if desired the frames 2 and 3 may be readily and easily disconnected from each other by merely sliding the said arms apart, and it is to be further understood that while I have described the preferred structure of the apparatus which I now consider the best embodiment thereof, I desire to have it understood that the apparatus shown is merely illustrative and that minor details within the scope of the following claim may be resorted to if desired.

Having thus described the invention, what is claimed as new is:—

In a trestle of the class described, an outer and an inner frame, said outer frame being slidably connected with the inner frame, the sides of the inner frame comprising a pair of spaced members, the upper connecting bar of the inner frame projecting beyond the side members, the outer frame having its vertical members provided with teeth upon their outer faces, and with vertical grooves upon their inner faces, the grooves of the outer frame being adapted for the reception of the projections of the inner frame, the lower portions of the side members of the outer frame being bifurcated, a shaft connecting the upper walls provided by the bifurcations and extending through the spaced vertical members of the inner frame, a bar for the shaft, a flexible connection between the shaft and the top bar of the inner frame, and loosely mounted bales upon the inner frame adapted to contact the teeth of the outer frame.

In testimony whereof I affix my signature in presence of two witnesses.

GEORGE H. RATLEDGE, Sr.

Witnesses:
    A. J. LAWTON,
    CHESTER I. DALE.